Figures 1, 2:
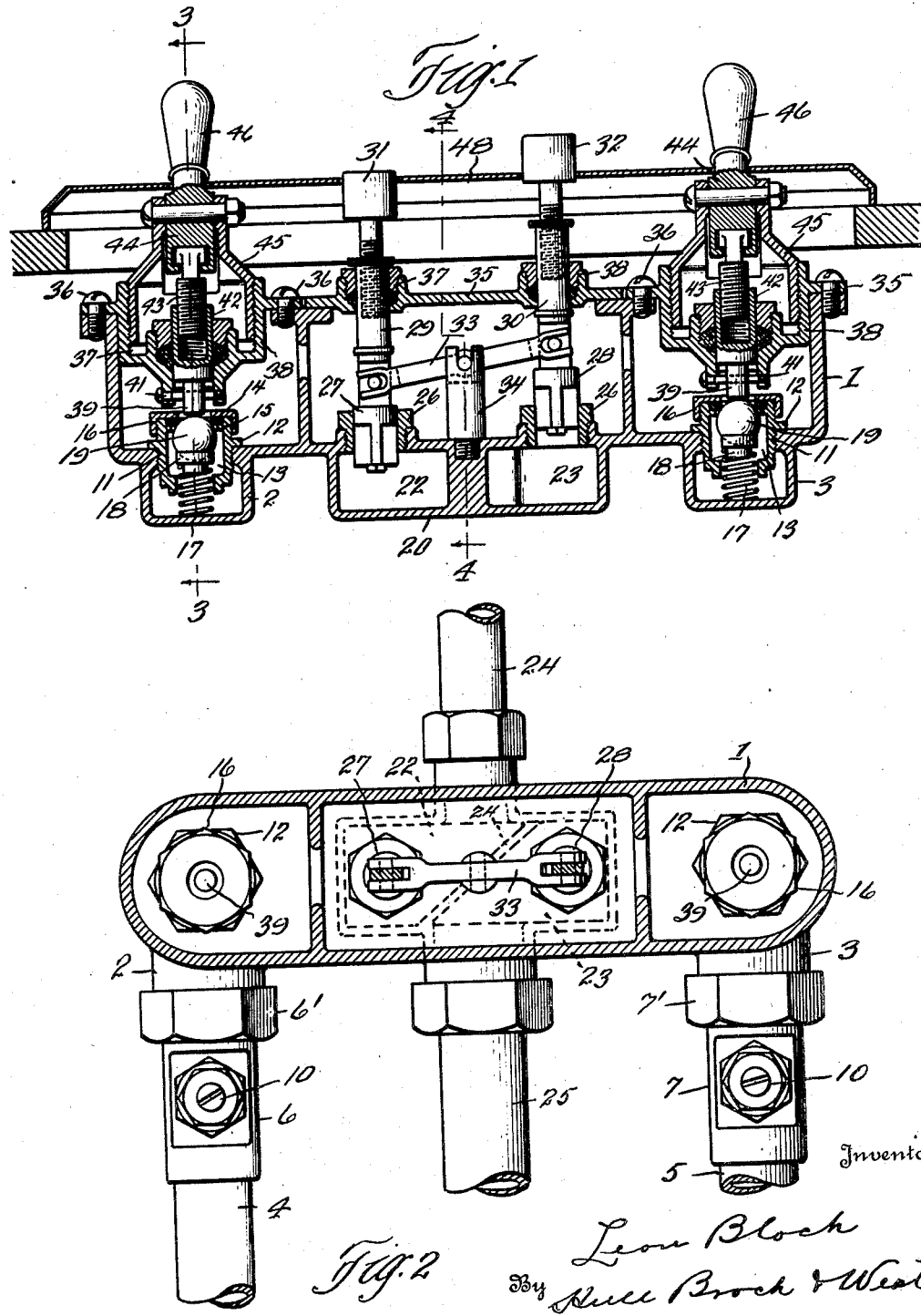

Nov. 8, 1927.

L. BLOCH

BATHROOM FIXTURE

Filed Oct. 28, 1926

1,647,984

2 Sheets-Sheet 1

Inventor

Leon Bloch

By Hull Brock & West

Attorney

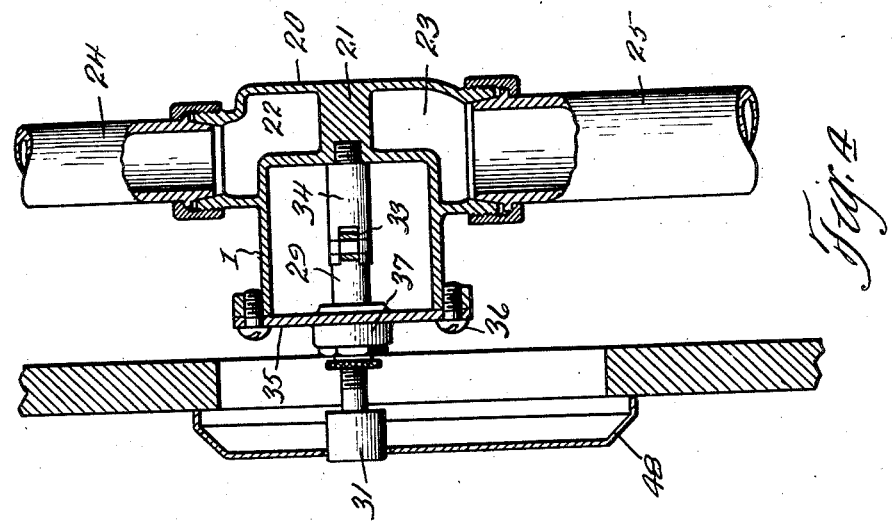
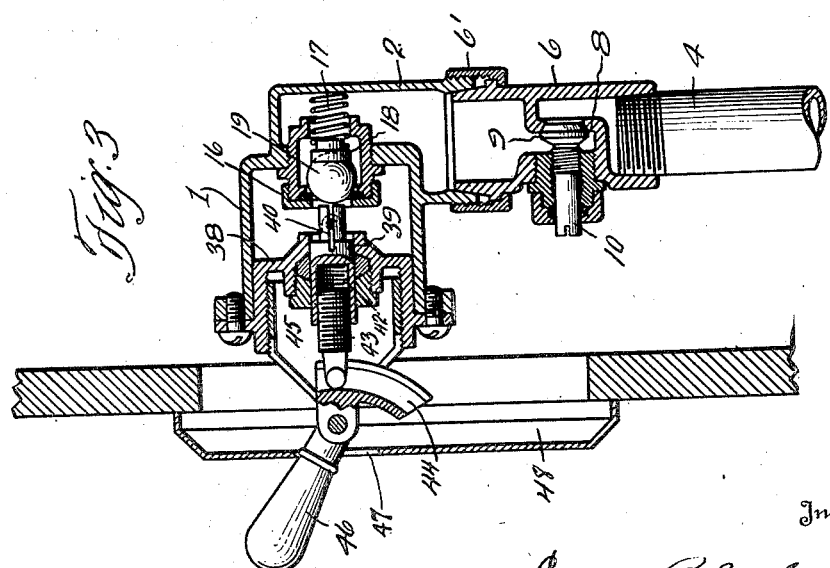

Patented Nov. 8, 1927.

1,647,984

UNITED STATES PATENT OFFICE.

LEON BLOCH, OF CLEVELAND, OHIO, ASSIGNOR TO THE REPUBLIC BRASS COMPANY, OF CLEVELAND, OHIO, A CORPORATION OF OHIO.

BATHROOM FIXTURE.

Application filed October 28, 1926. Serial No. 144,699.

This invention relates generally to bathroom fixtures and more particularly to an improved construction of fixture adapted to be positioned within an opening in a wall of a bathroom and by means of which the water can be directed either to the tub or to the shower as desired.

The main object of the invention is to provide an exceedingly neat and simple device which will display prominently only the operating mechanism for the valves, the valves themselves being enclosed within a casing disposed within an opening in a wall structure.

Another object of the invention is to provide a single casing in which are housed the inlet control valves and the valves for diverting the flow to the shower or to the tub, such casing being disposed within an opening in a wall structure and detachably connected with the inlet and outlet pipes in such a manner that the casing and valves may be removed as a unit.

A further object of the invention is to provide a valve casing of the character described which is provided with detachable connections for connecting the same with the hot and cold water inlet pipes and with a pair of discharge pipes leading respectively to a shower head and to a bathtub faucet and in which the inlet connections are provided with auxiliary valves which may be closed to prevent the flow of water to the casing and permit the casing to be readily removed.

A further object of the invention is to provide an operating mechanism for the inlet valves which may be adjusted to vary the length of the valve actuating member so as to accommodate the device for use with walls of different thickness.

A still further object of the invention is to provide a bathroom fixture of the character described in which all of the necessary valves are arranged within a single casing and which is well adapted for quantity production at comparatively low cost.

The invention consists in the novel features of construction and in the manner of combining and arranging the various parts, all of which will be more fully described hereinafter and set forth in the appended claims.

In the drawings forming a part of this specification, Fig. 1 is a horizontal sectional view showing my improved fixture positioned within an opening in a wall structure with the escutcheon plate secured in place over the opening; Fig. 2 is a view partly in vertical section and partly in elevation of my improved fixture with the inlet and outlet pipes secured thereto; Fig. 3 is a vertical sectional view on the line 3—3 of Fig. 1 and Fig. 4 is a vertical sectional view on the line 4—4 of Fig. 1.

Referring now to the drawings the numeral 1 designates a casing which is preferably shaped as shown although it is understood that any other convenient shape may be employed. The casing 1 is provided with connections 2 and 3 adapted to be connected with hot and cold water pipes 4 and 5, respectively, by means of unions 6 and 7 and collars 6' and 7'. Each union is provided with a partition 8 having an opening therein shaped to provide a valve seat against which seats a valve 9. The stem 10 of the valve 9 extends through a suitable stuffing box and at its outer end is provided with a tool engaging portion by means of which the valve may be actuated. The inlet connections 2 and 3 are preferably cast integral with the bottom of the casing and form in effect inlet chambers for hot and cold water. Each of the inlet chambers communicates with the interior of the casing as shown in Fig. 1 through inlet openings provided in the bottom of the casing. Threadedly mounted in the inlet opening 2 is a sleeve 11 having an outwardly projecting peripheral flange 12 thereon and the sleeve is in open communication with the inlet chamber through its bottom and also through port 13. The upper end of the sleeve is exteriorly threaded and is provided with an inwardly projecting annular flange 15, the upper side of the sleeve being recessed to receive an annular packing washer 14 which forms a valve seat against which the valve 19 seats and is secured in place by a collar or nut 16. The lower end of the sleeve 11 projects downwardly into the inlet chamber and has its lower end open and positioned within this opening is a light coil spring 17 which supports a cup shaped plate 18 on which rests loosely a ball valve 19. The spring 17 urges the valve 19 towards its seat but its main function is to prevent chattering of the valve as the valve seats in the direction of flow of the water. The inlet connection 3 and its associated parts are identical with the inlet connection 2 and hence only one will be described in detail.

Preferably cast integral with the bottom of the casing near its central portion is an outlet chamber 20 having a portion 21 therein dividing the same into a pair of outlet compartments 22 and 23 to which are connected respectively outlet pipes 24 and 25 leading one to a shower head and the other to a bathtub. The outlet compartments 22 and 23 each communicate with the interior of the casing through suitable openings provided in the bottom of the same. Threadedly mounted in the aforementioned openings are bushings 26 shaped to provide valve seats in which seat valves 27 and 28 of the type disclosed in my copending application Serial No. 93,911, filed March 11, 1926. The valves 27 and 28 have stems 29 and 30 which extend through the top of the casing and at their outer ends are provided with push buttons 31 and 32. The valve stems 29 and 30 are connected by a link 33 which is pivotally mounted on a post 34 so that when one of the valves is closed the other is open and vice versa. The casing 1 is closed by a cover plate 35 which is secured to the top of the casing by screws 36 and the cover plate is provided with stuffing boxes 37 and 38 through which the valve stems 29 and 30 work. The cover plate 35 is also provided adjacent each end with an opening 37 which is interiorly threaded as shown and which lies immediately above and opposite the inlet connections 2 and 3. Secured within each opening 37 is the actuating mechanism for the inlet valves. The actuating mechanism for the two inlet valves are identical and only one will be described in detail.

The actuating mechanism for the inlet valve is so constructed and mounted as to be adjustable for walls of different thickness. For accomplishing this result the top plate 36 is provided with a depending interiorly threaded portion designated 38, in the lower end of which is slidably mounted a valve actuating member 39 having a longitudinally extending slot 40 therein and through which extends a pin 41 for guiding the same. The upper end of the member 39 is recessed and interiorly threaded as shown at 42 to receive therein a valve actuating member 43. The valve actuating member 43 is operatively connected to a cam lever 44 which is pivotally mounted on a bracket 45 which is threadedly secured in opening 37 as shown most clearly in Figs. 1 and 4. The casing 1 and its associated parts are adapted to be positioned behind a wall as shown in Figs. 3 and 4. The cam lever 44 is provided with a handle 46 which projects through a slot 47 in an escutcheon plate 48 secured over the opening in the wall.

When the cam lever 46 is depressed the valve actuating member 43 which is threadedly received in recess 42 is also moved and the stem 39 is moved to engage the valve 19 and move the same away from its seat. The threads in the member 43 are of the same pitch as the threads on the interior of the opening 37. When the bracket 45 is turned the member 43 turns with it and is moved outwardly within the recess 42. It will therefore be seen that the member 43 may be adjusted so as to vary the effective length of the stroke of the valve stem 39 so that it is necessary merely to move the bracket 45 in or out to accommodate the device to walls of different thickness, the movement of the handle 46 being always the same.

When it is desired to remove the casing 1, the valve stems 10 may be actuated by a screw driver or other suitable tool to move the valves 9 against their seats to cut off the flow of water to the casing. The casing 1 may then be disconnected from the hot and cold water inlet pipes 4 and 5 and from the discharge pipes 24 and 25 and removed through the opening in the wall as a unit. The escutcheon plate 48 completely covers the opening in the wall structure and the handles 46 and push buttons 31 and 32 extend through suitably shaped openings in the same. The supply of hot and cold water is regulated by moving the handles 46 and the water may be diverted to a shower head or to the tub by pressing one or the other of the push buttons 31 or 32.

It will now be clear that I have provided a device which will accomplish the objects of the invention as hereinbefore stated.

Having thus described my invention, what I claim is:—

1. In a device of the class described, a casing having a pair of inlet openings and two or more outlet openings, valves for controlling the supply of water through said inlet openings, valves for diverting the flow of water through any one of said outlet openings, all of said valves being enclosed by said casing, a cover for said casing, stems for said valves projecting through said cover, an apertured plate in which said stems work.

2. In a device of the class described, a casing adapted to be inserted in an opening in a wall structure and having a pair of inlet openings and a plurality of outlet openings, valves arranged within said casing and controlling the flow through said inlet openings, a plurality of valves arranged within said casing and adapted to be alternately opened and closed to divert the flow through any one of said outlet openings, a cover for said casing, stems for said valves extending through said cover and an apertured plate for covering the opening in the wall structure and in which said valve stems work.

3. A device of the class described comprising a casing having inlet and outlet connections, inlet pipes detachably connected with said inlet connections and outlet pipes detachably connected with said outlet connections, inlet valves arranged within said casing for controlling the flow into said casing, valve means within said casing for diverting the flow through any one of said outlet connections and inlet valve actuating mechanism carried by said casing and means for adjusting the position of said inlet valve actuating mechanism with respect to said inlet valves.

4. In a device of the class described, a casing adapted to be arranged within an opening in a wall structure and having a pair of inlet openings therein adapted to be detachably connected to hot and cold water supply pipes, valves arranged within said casing and adapted to regulate the flow of water through said inlets, a plurality of outlet pipes detachably connected with said casing and valve means for diverting the flow of water through any one of said outlet pipes, operating mechanism for said inlet valves carried by said casing and means for adjusting the position of said valve operating mechanism with respect to said inlet valves, said inlet valves and their operating mechanism being removable as a unit along with said casing.

5. In a device of the class described, a casing having a pair of inlets and a plurality of outlets, a pair of valves for controlling the flow through said inlets, valve means for diverting the flow through either of said outlets, valve actuating mechanism for each of said inlet valves comprising an adjustable valve actuating member, means for operating said valve actuating member to move said valve from its seat and means for increasing or decreasing the length of said valve actuating member.

6. A device as set forth in claim 5 in which said valves and valve actuating mechanism are carried by siad casing and removable therewith as a unit.

7. A fixture of the class described comprising a casing adapted to be disposed within an opening in a wall structure and having a plurality of inlet openings and a plurality of outlet openings, inlet connections for connecting said inlet openings with hot and cold water inlet pipes, an auxiliary valve in each of said inlet connections, outlet connections for connecting said outlet openings with outlet pipes, valves within said casing for controlling the flow through said inlet openings and valve means within said casing for selectively diverting the flow through any one of said outlet pipes, a cover for said casing, the actuating means for said inlet and outlet valves extending through said cover, an apertured escutcheon plate secured over the opening in the wall structure and through which the actuating means for said valves extend, said escutcheon plate and opening in the wall structure being of sufficient size to render said auxiliary valves and said inlet and outlet connections accessible through said opening whereby said auxiliary valves may be closed and said inlet and outlet connection disconnected and said casing and its contained valve mechanisms removed from said opening as a unit.

8. A bathroom fixture including a pair of valves for controlling the supply of hot and cold water respectively, independent valve mechanism for diverting the flow through any one of a plurality of outlets, said pair of valves and valve mechanism being positioned within a single opening in a wall structure and a single apertured escutcheon plate secured over said opening, separate and independent operating means for said pair of valves and for said diverter valve mechanism, a part of each of said operating means extending through said apertured escutcheon plate and operable from the exterior thereof.

9. In a device of the class described, a casing adapted to be inserted in an opening in a wall structure and having a pair of inlet openings being adapted to be connected to hot and cold water supply pipes, valve mechanism for controlling the supply of hot and cold water to said casing, two or more outlets leading from said casing and separate and independent valve mechanism for diverting the flow of water through any one of said outlets, said valve mechanisms being arranged within said casing and removable from said wall opening as a unit along with said casing, an apertured escutcheon plate for covering the opening in the wall structure, the operating handles for each of said valve mechanisms extending through the escutcheon plate and operable from the exterior thereof.

10. A bathroom fixture comprising a casing adapted to be inserted within an opening in a wall structure and having a pair of inlet openings adapted to be connected with hot and cold water supply pipes, valve mechanism arranged within said casing and adapted to regulate the supply of hot and cold water to said casing, said casing having two or more outlets leading therefrom and separate and independent valve mechanism arranged within said casing and adapted to divert the flow of water through any one of said outlets, an apertured escutcheon plate secured over the wall, the operating handles for each of said valve mehanisms extending through said apertured escutcheon plate and operable from the exterior thereof.

11. A device of the class described comprising a casing adapted to be positioned within an opening in a wall structure and having a pair of inlets, detachable connections connecting said pair of inlets with hot and cold water supply pipes, a pair of valves arranged within said casing and adapted to control the supply of hot and cold water through said inlets, a pair of outlets leading from said casing and valve mechanism arranged within said casing for diverting the flow through either of said outlets, a valve in each of said detachable connections serving as additional means for cutting off the supply of hot and cold water, an apertured escutcheon plate secured over the opening in the wall structure, the operating handles for said pair of valves and said value mechanism extending through said apertured escutcheon plate and operable from the exterior thereof, said escutcheon plate being of such a size with respect to the opening in the wall structure as to render the valves in said detachable connection accessible through the opening whereby the valves in the detachable connections may be closed and said inlet and outlet connections disconnected and said casing and its contained valve mechanism removed from said opening as a unit.

12. A bathroom fixture comprising a casing adapted to be secured within an opening in the wall structure and having a pair of inlets adapted to be connected to hot and cold water supply pipes respectively and a plurality of outlets leading therefrom, a valve mechanism for controlling the supply of hot and cold water through said inlets, separate and independent valve mechanism for diverting the flow through any one of said plurality of outlets, said valve mechanisms being arranged within said casing and removable from said wall opening as a unit along with said casing, a single apertured escutcheon plate secured over said opening, a part of the operating means for each of said valve mechanisms extending through said apertured escutcheon plate and operable from the exterior thereof.

In testimony whereof, I hereunto affix my signature.

LEON BLOCH.